(12) United States Patent
Tanaka

(10) Patent No.: US 10,519,284 B2
(45) Date of Patent: Dec. 31, 2019

(54) PROCESSES FOR PRODUCING WET RUBBER MASTERBATCH AND RUBBER COMPOSITION

(71) Applicant: TOYO TIRE & RUBBER CO., LTD., Itami-shi, Hyogo (JP)

(72) Inventor: Makoto Tanaka, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 108 days.

(21) Appl. No.: 15/743,789

(22) PCT Filed: Aug. 10, 2016

(86) PCT No.: PCT/JP2016/073622
§ 371 (c)(1),
(2) Date: Jan. 11, 2018

(87) PCT Pub. No.: WO2017/085972
PCT Pub. Date: May 26, 2017

(65) Prior Publication Data
US 2018/0201741 A1   Jul. 19, 2018

(30) Foreign Application Priority Data

Nov. 16, 2015 (JP) ................................. 2015-223564

(51) Int. Cl.
| | |
|---|---|
| *C08J 3/00* | (2006.01) |
| *C08J 3/22* | (2006.01) |
| *B29B 7/42* | (2006.01) |
| *C08L 21/02* | (2006.01) |
| *B29B 7/84* | (2006.01) |
| *C08J 3/21* | (2006.01) |

(52) U.S. Cl.
CPC ..................................... *C08J 3/22* (2013.01); *B29B 7/42* (2013.01); *B29B 7/84* (2013.01); *C08J 3/212* (2013.01); *C08L 21/02* (2013.01); *C08J 2319/02* (2013.01); *C08L 2310/00* (2013.01)

(58) Field of Classification Search
CPC .......... C08J 3/22; C08J 3/212; C08J 2310/00; B29C 48/92; B29C 48/022; C08L 7/00; C08L 7/02; C08L 21/02; C08L 2310/00; B29B 7/42; B29B 7/84
USPC ......................................................... 523/351
See application file for complete search history.

(56) References Cited

U.S. PATENT DOCUMENTS

| | | | |
|---|---|---|---|
| 9,714,325 B2* | 7/2017 | Miyasaka | ............... C08J 3/2053 |
| 2011/0021664 A1 | 1/2011 | Wang et al. | |
| 2017/0137582 A1* | 5/2017 | Nomura | .................... B60C 1/00 |
| 2018/0179365 A1* | 6/2018 | Konno | ........................ C08J 3/09 |

FOREIGN PATENT DOCUMENTS

| | | |
|---|---|---|
| JP | 2010-248327 A | 11/2010 |
| JP | 2012-131943 A | 7/2012 |
| JP | 2013-139580 A | 7/2013 |
| JP | 2014-91810 A | 5/2014 |

OTHER PUBLICATIONS

International Search Report dated Nov. 15, 2016, issued in counterpart International Application No. PCT/JP2016/073622 (2 pages).
Notification of Transmittal of Translation of the International Preliminary Report on Patentability (Form PCT/IB/338) issued in counterpart International application No. PCT/JP2016/073622 dated May 31, 2018, with Forms PCT/IB/373 and PCT/ISA/237. (8 pages).
Office Action dated Jun. 28, 2019, issued in Japanese Patent Application No. JP2015-223564, with English translation.

* cited by examiner

*Primary Examiner* — Hannah J Pak
(74) *Attorney, Agent, or Firm* — Westerman, Hattori, Daniels & Adrian, LLP

(57) ABSTRACT

A process for producing a wet rubber masterbatch yielded by using, as raw materials, at least a filler, a dispersing solvent, and a rubber latex solution, comprises a step (i) of mixing the filler, the dispersing solvent and the rubber latex solution with each other to produce a filler-containing rubber latex solution, a step (ii) of solidifying the filler-containing rubber latex solution to produce a filler-containing rubber solidified product, and a step (iii) of dehydrating the filler-containing rubber solidified product to produce the wet rubber masterbatch. At the time of representing the temperature of the filler-containing rubber solidified product before the dehydration in the step (iii) by T1 (° C.), and representing the temperature of the filler-containing rubber solidified product after the dehydration by T2 (° C.), the following expressions (1) and (2) are satisfied:

$$T1 \leq 100 \quad (1)$$

$$80 \leq T2 - T1 \leq 160 \quad (2).$$

6 Claims, 1 Drawing Sheet

PROCESSES FOR PRODUCING WET RUBBER MASTERBATCH AND RUBBER COMPOSITION

TECHNICAL FIELD

The present invention relates to a process for producing a wet rubber masterbatch yielded by using, as raw materials, at least a filler, a dispersing solvent, and a rubber latex solution; and a process for producing a rubber composition for tires that includes the wet rubber masterbatch.

BACKGROUND ART

In the rubber industry, it has been hitherto known that when a rubber composition is produced which includes a filler such as carbon black, a wet rubber masterbatch is used to improve the workability of the rubber composition and the dispersibility of the filler. This manner is a manner of mixing the filler and a dispersing solvent with each other beforehand at a predetermined ratio, dispersing the filler into the dispersing solvent by mechanical force, mixing the resultant filler-containing slurry solution with a rubber latex solution in a liquid phase, adding a solidifier such as an acid, after the mixing, to the mixture to solidify the mixture, collecting the solidified product, and then drying the collected product. The use of the wet rubber masterbatch can give a rubber composition better in filler-dispersibility, and rubber properties such as workability and reinforceability than the use of any dry rubber masterbatch, which is yielded by mixing a filler and a rubber with each other in a solid phase. The use of such a rubber composition as a raw material makes it possible to produce, for example, a pneumatic tire decreased in rolling resistance and excellent in fatigue resistance, and such a rubber product.

A process for producing a wet rubber masterbatch indispensably requires a dehydrating step in which from a filler-containing rubber solidified product yielded by mixing at least a filler, a dispersing solvent and a rubber latex solution with each other and then solidifying the mixture, the dispersing solvent, in particular, water is removed. In this dehydrating step, it is general to remove water from the filler-containing rubber solidified product by applying shearing force to the filler-containing rubber solidified product while heating the product by use of a monoaxial extruder or biaxial extruder. However, unless the heating temperature thereof, and others are adjusted, water may not be sufficiently removed, or various properties of the produced wet rubber masterbatch may be deteriorated.

Patent Document 1 listed below describes a producing process in which a dehydrating extruder is used to adjust the proportion of water contained in a masterbatch clam into the range of about 1 to 20% by mass. However, this document neither describes nor suggests conditions for temperature-adjustment before and after the dehydration.

PRIOR ART DOCUMENT

Patent Document

Patent Document 1: JP-A-2013-139580

SUMMARY OF THE INVENTION

Problems to be Solved by the Invention

In the light of the above-mentioned actual situation, the present invention has been made. An object thereof is to provide a process for producing a wet rubber masterbatch, and a process for producing a rubber composition that each make it possible to dehydrate the rubber masterbatch effectively without deteriorating rubber properties of the finally-obtained vulcanized rubber.

Means for Solving the Problems

The object can be attained by the present invention described in the following: a process for producing a wet rubber masterbatch yielded by using, as raw materials, at least a filler, a dispersing solvent, and a rubber latex solution, comprising: a step (i) of mixing the filler, the dispersing solvent and the rubber latex solution with each other to produce a filler-containing rubber latex solution, a step (ii) of solidifying the filler-containing rubber latex solution to produce a filler-containing rubber solidified product, and a step (iii) of dehydrating the filler-containing rubber solidified product to produce the wet rubber masterbatch, wherein at the time of representing the temperature of the filler-containing rubber solidified product before the dehydration in the step (iii) by T1 (° C.), and representing the temperature of the filler-containing rubber solidified product after the dehydration by T2 (° C.), the following expressions (1) and (2) are satisfied:

$$T1 \leq 100 \quad (1)$$

$$80 \leq T2 - T1 \leq 160 \quad (2).$$

In this producing process, the filler-containing rubber solidified product, which is yielded by mixing at least a filler, a dispersing solvent and a rubber latex solution with each other (the step (i)) and then solidifying the mixture (the step (ii)), is dehydrated in the step (iii). In this way, a wet rubber masterbatch is produced. As far as the inventors know, no report example has been made about a technique of dehydrating, in this dehydrating step, the filler-containing rubber solidified product while optimizing the temperature of the filler-containing rubber solidified product before and after the dehydration of this product. However, the inventors have found out that at the time of representing the temperature of the filler-containing rubber solidified product before the dehydration by T1 (° C.), and representing the temperature of the filler-containing rubber solidified product after the dehydration by T2 (° C.), the dehydrating step is performed while the following expressions (1) and (2) are satisfied, thereby making it possible to prevent rubber properties of the finally obtained vulcanized rubber from being deteriorated while water is effectively removed from the rubber solidified product:

$$T1 \leq 100 \quad (1)$$

$$80 \leq T2 - T1 \leq 160 \quad (2).$$

In the producing process, it is preferred that the step (iii) is a step of using a monoaxial extruder or a biaxial extruder to dehydrate the filler-containing rubber solidified product, and the rotation number R (rpm) of a screw of the monoaxial extruder or the biaxial extruder satisfies the following: $2 \leq R \leq 35$. This producing process makes it possible to apply shearing force appropriately to the filler-containing rubber solidified product through the screw of the monoaxial extruder or the biaxial extruder to prevent the rubber properties of the finally obtained vulcanized rubber further from being deteriorated while water is effectively removed from the filler-containing rubber solidified product.

In the producing process, it is preferred that the temperature of only a partial moiety of the screw at an outlet side of the screw is adjusted to a temperature of 100° C. or higher and lower than 270° C. This producing process makes it possible to heighten the temperature of the filler-containing rubber solidified product near the outlet while heightening the shearing force applied to the filler-containing rubber solidified product through the screw to prevent the rubber properties of the finally obtained vulcanized rubber still further from being deteriorated while water is more effectively removed from the filler-containing rubber solidified product. At the time of representing the entire length of the screw that is measured from a tip of the screw at the outlet side of the screw by L, in particular, the temperature of a moiety of the screw that has a length of $\alpha L$ wherein $0.4 \le \alpha \le 0.95$ from the tip of the screw at the outlet side thereof may be adjusted to a temperature of 100° C. or higher and lower than 270° C. This case makes it possible to prevent, particularly, the deterioration of the rubber properties of the finally obtained vulcanized rubber while water is still more effectively removed from the filler-containing rubber solidified product.

The present invention also relates to a process for producing a rubber composition including a wet rubber masterbatch yielded by using, as raw materials, at least a filler, a dispersing solvent, and a rubber latex solution, and this process includes a step (i) of mixing the filler, the dispersing solvent and the rubber latex solution with each other to produce a filler-containing rubber latex solution, a step (ii) of solidifying the filler-containing rubber latex solution to produce a filler-containing rubber solidified product, a step (iii) of dehydrating the filler-containing rubber solidified product to produce the wet rubber masterbatch, and a step (iv) of dry-mixing the wet rubber masterbatch with various blending agents to produce the rubber composition, wherein at the time of representing the temperature of the filler-containing rubber solidified product before the dehydration in the step (iii) by T1 (° C.), and representing the temperature of the filler-containing rubber solidified product after the dehydration by T2 (° C.), the following expressions (1) and (2) are satisfied:

$$T1 \le 100 \tag{1}$$

$$80 \le T2 - T1 \le 160 \tag{2}$$

In this producing process, the dehydrated wet rubber masterbatch is used as a raw material to produce a rubber composition while prevented from being deteriorated, so that a vulcanized rubber yielded using this rubber composition as a raw material can be prevented from being deteriorated in rubber properties.

In this producing process, it is preferred that the step (iii) is a step of using a monoaxial extruder or a biaxial extruder to dehydrate the filler-containing rubber solidified product, and the rotation number R (rpm) of a screw of the monoaxial extruder or the biaxial extruder satisfies the following: $2 \le R \le 35$.

In the producing process, it is preferred that the temperature of only a partial moiety of the screw at an outlet side of the screw is adjusted to a temperature of 100° C. or higher and lower than 270° C.

In the producing process, it is preferred that at the time of representing the entire length of the screw that is measured from a tip of the screw at the outlet side of the screw by L, the temperature of a moiety of the screw that has a length of $\alpha L$ wherein $0.4 \le \alpha \le 0.95$ from the tip of the screw at the outlet side thereof is adjusted to a temperature of 100° C. or higher and lower than 270° C.

MODE FOR CARRYING OUT THE INVENTION

Figure 1:
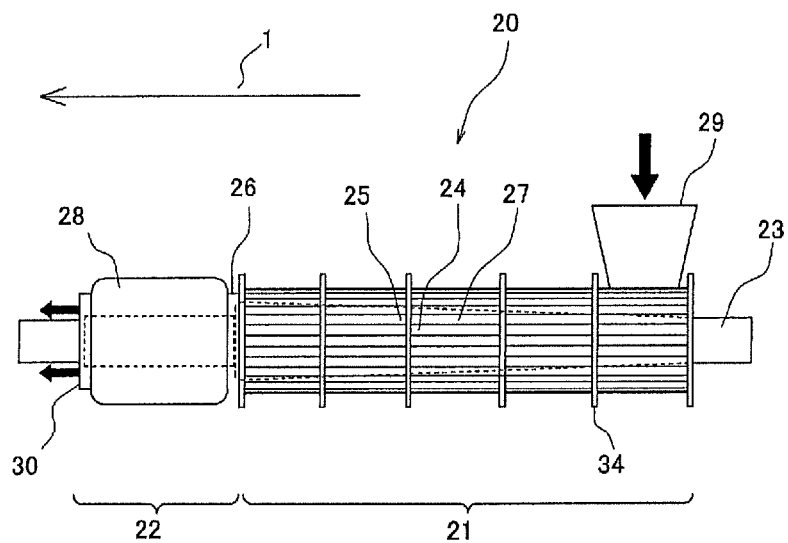
FIG. 1 is an example of an external view of a monoaxial extruder usable in the present invention.

The process according to the present invention for producing a wet rubber masterbatch makes use of at least a filler, a dispersing solvent and a rubber latex solution as raw materials.

In the present invention, the filler denotes an inorganic filler used usually in the rubber industry, such as carbon black, silica, clay, talc, calcium carbonate, magnesium carbonate, or aluminum hydroxide. Out of these inorganic fillers, carbon black is in particular preferably used in the invention.

Usable examples of the species of the carbon black include carbon black species used in an ordinary rubber industry, such as SAF, ISAF, HAF, FEF, and GPF; and electroconductive carbon black species such as acetylene black and ketjen black. The species of the carbon black may be granulated carbon black, which has been granulated, considering the handleability thereof in an ordinary rubber industry; or non-granulated carbon black.

The dispersing solvent is in particular preferably water, and may be, for example, water containing an organic solvent.

The rubber latex solution may be a natural rubber latex solution or a synthetic rubber latex solution.

The natural rubber latex solution is a natural product produced by metabolic effect of plants, and is in particular preferably a natural-rubber/water system solution, in which a dispersing solvent is water. The number-average molecular weight of a natural rubber in the natural rubber latex solution used in the present invention is preferably 2000000 or more, more preferably 2500000 or more. About the natural rubber latex solution, concentrated latex, and fresh latex called field latex are usable about being distinguished from each other. The synthetic rubber latex solution is, for example, a styrene-butadiene rubber, butadiene rubber, nitrile rubber or chloroprene rubber that has been produced by emulsion polymerization.

Hereinafter, a description will be specifically made about the process according to the present invention for producing a wet rubber masterbatch for tires. This producing process is a process for producing a wet rubber masterbatch yielded by using, as raw materials, at least a filler, a dispersing solvent, and a rubber latex solution, this process including: a step (i) of mixing the filler, the dispersing solvent and the rubber latex solution with each other to produce a filler-containing rubber latex solution, a step (ii) of solidifying the filler-containing rubber latex solution to produce a filler-containing rubber solidified product, and a step (iii) of dehydrating the filler-containing rubber solidified product to produce the wet rubber masterbatch, wherein at the time of representing the temperature of the filler-containing rubber solidified product before the dehydration in the step (iii) by T1 (° C.), and representing the temperature of the filler-containing rubber solidified product after the dehydration by T2 (° C.), the following expressions (1) and (2) are satisfied:

$$T1 \le 100 \tag{1}$$

$$80 \le T2 - T1 \le 160 \tag{2}$$

(1) Step (i)

In the step (i), a filler, a dispersing solvent and a rubber latex solution are mixed with each other to produce a filler-containing rubber latex solution. In the present invention, the step (i) in particular preferably includes a step (i-(a)) in which when the filler is dispersed into the dispersing solvent, at least one portion of the rubber latex solution is added thereto to produce a slurry solution containing the filler to which rubber latex particles adhere; and a step (i-(b)) in which the slurry solution containing the filler, to which the rubber latex particles adhere, is mixed with the rest of the rubber latex solution to produce a rubber latex solution containing the filler, to which the rubber latex particles adhere. Hereinafter, the steps (i-(a)) and (i-(b)) will be described. The description is, particularly, about an example using carbon black as the filler in the present embodiment.

Step (i-(a))

When carbon black is dispersed into a dispersing solvent in the step (i-(a)), at least one portion of a rubber latex solution is added thereto to produce a slurry solution containing the carbon black to which rubber latex particles adhere. It is allowable to mix the rubber latex solution beforehand with the dispersing solvent, and then add the carbon black to the mixture to be dispersed therein. It is also allowable to add the carbon black into the dispersing solvent, and next disperse the carbon black in the dispersing solvent while adding the rubber latex solution into the carbon-black/dispersing-solvent system; or add the carbon black into the dispersing solvent, and next disperse the carbon black in the dispersing solvent while adding a predetermined amount of the rubber latex solution, through operation divided into several times, to the carbon-black/dispersing-solvent system. In the presence of the rubber latex solution, the carbon black is dispersed in the dispersing solvent, thereby making it possible to produce the slurry solution, which contains the carbon black to which the rubber latex particles adhere. In the step (i-(a)), the addition amount of the rubber latex solution is, for example, from 0.075 to 12% by mass of the whole of the rubber latex solution used (the whole of the rubber latex solution portions added in the steps (i-(a)) and (i-(b)).

In the step (i-(a)), the amount of the solid (rubber) in the added rubber latex solution is preferably from 0.25 to 15%, more preferably from 0.5 to 6% by mass of the carbon black. The concentration of the solid (rubber) in the added rubber latex solution is preferably from 0.2 to 5% by mass, more preferably from 0.25 to 1.5% by mass. In these cases, a rubber masterbatch can be produced in which the dispersion degree of the carbon black is heightened while the rubber latex particles are certainly caused to adhere onto the carbon black.

In the step (i-(a)), the method for mixing the carbon black and the dispersing solvent with each other in the presence of the rubber latex solution is a method of dispersing the carbon black, using an ordinary dispersing machine such as a highly shearing mixer, a High Shear Mixer, a homo-mixer, a ball mill, a bead mill, a high-pressure homogenizer, an ultrasonic homogenizer or a colloid mill.

The "highly shearing mixer" means a mixer having a high-speed-rotatable rotor and a fixed stator in which in the state of making a precise clearance between the rotor and the stator, the rotor is rotated so that a highly shearing effect acts. In order to produce such a highly shearing effect, it is preferred to set the clearance between the rotor and the stator to 0.8 mm or less, and set the circumferential speed of the rotor to 5 m/s or more. Such a highly shearing mixer may be a commercially available product. An example thereof is a mixer, "High Shear Mixer", manufactured by a company Silverson.

When the carbon black is mixed, in the present invention, with the dispersing solvent in the presence of the rubber latex solution to produce the slurry solution, which contains the carbon black to which the rubber latex particles adhere, a surfactant may be added thereto in order to improve the carbon black in dispersibility. The surfactant may be a surfactant known in the rubber industry. Examples thereof include nonionic surfactants, anionic surfactants, cationic surfactants, and amphoteric surfactants. Instead of the surfactant or in addition to the surfactant, an alcohol such as ethanol may be used. However, when the surfactant is used, it is feared that the finally obtained vulcanized rubber is lowered in rubber properties. Thus, the blend amount of the surfactant is preferably 2 parts or less by mass, more preferably 1 part or less by mass for 100 parts by mass of the solid (rubber) in the rubber latex solution. It is preferred not to use any surfactant substantially.

Step (i-(b))

In the step (i-(b)), the slurry solution is mixed with the rest of the rubber latex solution to produce a rubber latex solution containing the carbon black, to which the rubber latex particles adhere. The method for mixing the slurry solution with the rest of the rubber latex solution in a liquid phase is not particularly limited, and may be a method of mixing the slurry solution with the rest of the rubber latex solution, using an ordinary dispersing machine such as a highly shearing mixer, a High Shear Mixer, a homo-mixer, a ball mill, a bead mill, a high-pressure homogenizer, an ultrasonic homogenizer or a colloid mill. The whole of the mixing system, for example, the dispersing machine may be optionally heated.

Considering the dehydrating period and labor in the next step (iii), the solid (rubber) concentration in the rest of the rubber latex solution is preferably higher than that in the rubber latex solution added in the step (i-(a)). Specifically, the former solid (rubber) concentration is preferably from 10 to 60% by mass, more preferably from 20 to 30% by mass.

(2) Step (ii)

In the step (ii), the filler-containing rubber latex solution is solidified to produce a filler-containing rubber solidified product. The method for the solidification is, for example, a method of incorporating a solidifier into the filler-containing rubber latex solution, in which the rubber latex particles adhere to the filler. In this case, the solidifier may be acids such as formic acid and sulfuric acid, salts such as sodium chloride, or any other acid or salt that is usually used to solidify a rubber latex solution. After the step (ii) and before the step (iii), the present process may optionally have a solid-liquid separating step, such as a centrifuging step or a heating step, to decrease, to an appropriate degree, the amount of water contained in the filler-containing rubber solidified product.

(3) Step (iii)

In the step (iii), at the time of representing the temperature of the filler-containing rubber solidified product before the dehydration by T1 (° C.), and representing the temperature of the filler-containing rubber solidified product after the dehydration by T2 (° C.), the filler-containing rubber solidified product is dehydrated under conditions satisfying the following expressions (1) and (2):

$$T1 \leq 100 \quad (1)$$

$$80 \leq T2-T1 \leq 160 \quad (2).$$

In the step (iii), it is preferred to dehydrate the filler-containing rubber solidified product, using a monoaxial extruder or a biaxial extruder. In an embodiment demonstrated below, a monoaxial extruder will be described as an example. However, a biaxial extruder has the same structure as the monoaxial extruder except that the former extruder has two screws.

A monoaxial extruder 20 illustrated in FIG. 1 has a screw 23, and an external cylinder 27 composed of a first external cylinder 25 positioned at an inlet 29 side (upstream side) of the extruder and a second external cylinder 26 positioned at an outlet 30 side (downstream side) thereof. A filler-containing rubber solidified product yielded through/after the step (ii) is charged from a supplying port 29 to the extruder, and then the product is advanced along the length direction of the external cylinder (screw axial direction) while being kneaded. Finally, the product is discharged from the outlet 30. An upstream side moiety of the extruder is also called a dehydrating section 21. A downstream side moiety thereof is also called a drying section (expander section) 22. The drying section 22 may be optionally equipped with a jacket 28 to adjust the temperature of this section. About the screw shape of this monoaxial extruder, and the length and the external cylinder diameter of the external cylinder (barrel), those of any monoaxial extruder that is used in an ordinary rubber industry may be used. Furthermore, the ratio between the external cylinder length and the external cylinder diameter may be set at will.

The rotation number R (rpm) of the screw of the monoaxial extruder preferably satisfies the following: $2 \leq R \leq 35$. If R is less than 2, shearing force applied to the filler-containing rubber solidified product may be lowered to lower the extruder in water-removing efficiency. In the meantime, if R is more than 35, shearing force applied to the filler-containing rubber solidified product becomes excessive so that the finally obtained vulcanized rubber may be deteriorated in rubber properties. Considering balance between the water-removing efficiency and the rubber properties of the finally obtained vulcanized rubber, the following is preferred: $5 \leq R \leq 30$.

Figure 2:
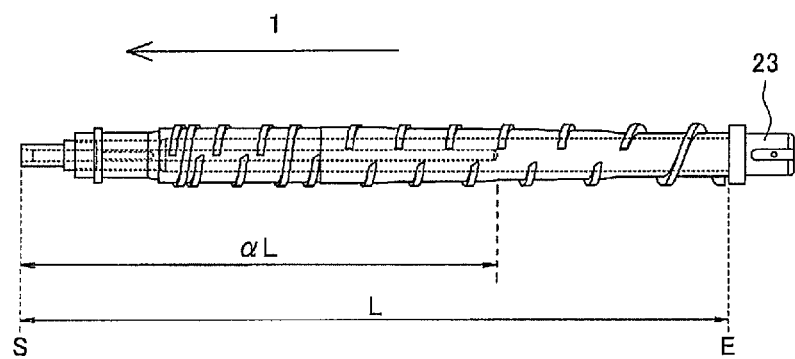
FIG. 2 is an example of an external view of a screw which the monoaxial extruder has.

The screw of the monoaxial extruder is preferably designed in such a manner that the temperature thereof is adjustable. The temperature of only a partial moiety of the screw at the outlet side thereof is preferably adjusted to a temperature of 100° C. or higher and lower than 270° C. In this case, near the inlet in the monoaxial extruder, shearing force applied, through the screw, to the filler-containing rubber solidified product is heightened while near the outlet the temperature of the filler-containing rubber solidified product is heightened. Consequently, water can be further efficiently removed from the filler-containing rubber solidified product while the finally obtained vulcanized rubber can be further prevented from being deteriorated in rubber properties. FIG. 2 illustrates an example of an external view of a screw which a monoaxial extruder usable in the present invention has. Considering balance between the water-removing efficiency and the rubber properties of the finally obtained vulcanized rubber, at the time of representing the entire length of the screw 23, which corresponds to the distance from a tip S of the screw at the outlet side thereof to an end E of the screw at the inlet side thereof, by L, the temperature of a moiety of the screw that has a length of $\alpha L$ wherein $0.4 \leq \alpha \leq 0.95$ from the tip S of the screw at the outlet side thereof is adjusted preferably to a temperature of 100° C. or higher and lower than 270° C., and the following inequality is more preferably satisfied: $0.5 \leq \alpha \leq 0.9$.

After the step (iii), the present process may separately have a drying step as needed in order to decrease the water content by percentage in the rubber masterbatch further. In a method for drying the rubber masterbatch, various drying machines may be used, examples thereof including a monoaxial extruder, a biaxial extruder, an oven, a vacuum drier, and an air drier.

(4) Step (iv)

In the step (iv), the wet rubber masterbatch is dry-mixed with various blending agents to produce a rubber composition. Usable examples of the blending agents include a sulfur-containing vulcanizer, a vulcanization promoter, an antiaging agent, silica, a silane coupling agent, zinc oxide, a methylene receptor and a methylene donor, stearic acid, a vulcanization promoting aid, a vulcanization retardant, an organic peroxide, softeners such as waxes and oils, a working aid, and other blending agents used ordinarily in the rubber industry.

The species of sulfur for the sulfur-containing vulcanizer may be any ordinary sulfur species for rubbers. Examples thereof include powdery sulfur, precipitated sulfur, insoluble sulfur, and highly dispersible sulfur. The sulfur content in the rubber composition according to the present invention is preferably from 0.3 to 6.5 parts by mass for 100 parts by mass of the rubber component. If the sulfur content is less than 0.3 part by mass, the resultant vulcanized rubber is short in crosslinkage density to be lowered in rubber strength and others. If the content is more than 6.5 parts by mass, the rubber is deteriorated, particularly, in both of heat resistance and endurance. In order to keep the rubber strength of the vulcanized rubber good certainly and improve the heat resistance and the endurance further, the sulfur content is set into a range more preferably from 1.5 to 5.5 parts by mass, even more preferably from 2 to 4.5 parts by mass for 100 parts by mass of the rubber component.

The vulcanization promoter may be a vulcanization promoter usable ordinarily for vulcanizing rubbers. Examples thereof include sulfenamide type, thiuram type, thiazole type, thiourea type, guanidine type, and dithiocarbamic acid salt type vulcanization promoters. These may be used singly or in the form of an appropriate mixture. The vulcanization promoter content is more preferably from 1 to 5 parts by mass, even more preferably from 1.5 to 4 parts by mass for 100 parts by mass of the rubber component.

The antiaging agent may be an antiaging agent usable usually for rubbers. Examples thereof include aromatic amine type, amine-ketone type, monophenolic type, bisphenolic type, polyphenolic type, dithiocarbamic acid salt type, and thiourea type antiaging agents. These may be used singly or in the form of an appropriate mixture. The antiaging agent content is more preferably from 1 to 5 parts by mass, even more preferably from 2 to 4.5 parts by mass for 100 parts by mass of the rubber component.

EXAMPLES

Hereinafter, this invention will be more specifically described by demonstrating working examples thereof.
(Used Materials)
a) Carbon black:
    Carbon black "N550" (nitrogen adsorption specific surface area: 42 m$^2$/g): "SEAST SO" (manufactured by Tokai Carbon Co., Ltd.);
b) Dispersing solvent: Water;
c) Rubber latex solution: Natural rubber latex solution (NR field latex) manufactured by a company Golden Hope (DRC=31.2%);

d) Solidifier: Formic acid (solution obtained by diluting a first-class 85% solution thereof into a 10% solution to adjust the pH of the diluted solution to 1.2), manufactured by Nacalai Tesque, Inc.;

e) Zinc oxide: Zinc Flower No. 3 (manufactured by Mitsui Mining & Smelting Co., Ltd.);

f) Stearic acid: "LUNAC S-20" (manufactured by Kao Corp.);

g) Wax: "OZOACE 0355" (manufactured by Nippon Seiro Co., Ltd.);

h) Antiaging agents:
  (A) N-phenyl-N'-(1,3-dimethylbutyl)-p-phenylenediamine "6PPD" (manufactured by the company Monsanto); melting point: 44° C., and
  (B) 2,2,4-Trimethyl-1,2-dihydroxyquinoline polymer "RD" (manufactured by Ouchi Shinko Chemical Industrial Co., Ltd.); melting point: 80 to 100° C.;

i) Sulfur: "5%-On-incorporated finely powdery sulfur" (manufactured by Tsurumi Chemical Industry Co., Ltd.); and j) Vulcanization promoters:
  (A) N-cyclohexyl-2-benzothiazol sulfonamide "SANCELER CM" (manufactured by Sanshin Chemical Industry Co., Ltd.), and
  (B) 1,3-Diphenylguanidine "NOCCELER D" (manufactured by Ouchi Shinko Chemical Industrial Co., Ltd.).

Examples 1 to 6, and Comparative Examples 2 to 4

In each of the examples, carbon black was added to a natural rubber latex diluted solution in water which had an adjusted concentration of 0.52% by mass to give a blend amount shown in Table 1 (the concentration of the carbon black in water was 5% by mass). Thereto was dispersed the carbon black, using a ROBOMIX manufactured by PRIMIX Corp. (ROBOMIX conditions: 9000 rpm for 30 minutes) to produce a carbon-black-containing slurry solution in which natural rubber latex particles shown in Table 1 adhered onto the carbon black (step (i)-(a)). Next, a natural rubber latex solution (25% by mass) was added to the carbon-black-containing slurry solution produced through the step (i-(a)), in which the natural rubber latex particles adhered onto the carbon black, to give a blend amount shown in Table 1. Next, a mixer for home use, SM-L56 model, manufactured by SANYO Electric Co., Ltd. was used to mix the entire components with each other (mixer conditions: 11300 rpm for 30 minutes) to produce a carbon-black-containing rubber latex solution in which the natural rubber latex particles adhered onto the carbon black (step (i)).

Formic acid as a solidifier was added to the carbon-black-containing rubber latex solution produced through the step (i), in which the natural rubber latex particles adhered onto the carbon black, until the pH of the solution turned to 4 to produce a carbon-black-containing rubber solidified product (step (ii)). The resultant carbon-black-containing rubber solidified product was charged into a monoaxial extruder, SCREW PRESS V-01 model, manufactured by SUEHIRO EPM Corp. to dehydrate the carbon-black-containing rubber solidified product to produce a wet rubber masterbatch (step (iii)). In each of the working examples and the comparative examples, the temperature of only a partial moiety of the screw that extended from the tip of the outlet in the screw was adjusted to attain the dehydration. The length αL of the moiety, the temperature of which was adjusted, is shown in Table 1.

Comparative Example 1

A wet rubber masterbatch was produced in the same way as in the above-mentioned working examples except that the temperature of the whole of the screw of the monoaxial extruder used in the step (iii) was adjusted.

In accordance with JIS K6238-2, a heat-drying type moisture meter manufactured by A & D Co., Ltd. was used to estimate the water content by percentage in the wet rubber masterbatch yielded in each of Examples 1 to 6 and Comparative Examples 1 to 4. It is meant that as a rubber masterbatch is lower in water content by percentage, the rubber masterbatch has been more effectively dehydrated. The results are shown in Table 1.

A Banbury mixer was used to dry-mix the wet rubber masterbatch yielded in each of Examples 1 to 6 and Comparative Examples 1 to 4 with various blending agents shown in Table 1 to produce a rubber composition according to one of Examples 1 to 6 and Comparative Examples 1 to 4 (step (iv)). About the blend proportion of any component in Table 1, the amount of the component is shown as an amount in the unit of parts by mass (phr) relative to the entire amount of the rubber component, which was regarded as 100 parts by mass.

The exothermic property of the resultant rubber compositions was evaluated, using the tan δ of a vulcanized rubber yielded from each of the compositions as an index. The rubber composition produced in each of Examples 1 to 6 and Comparative Examples 1 to 4 was vulcanized at 150° C. for 30 minutes to yield a vulcanized rubber sample. The tan δ of the vulcanized rubber sample was evaluated in accordance with JIS K6265. Specifically, a rheospectrometer E4000 manufactured by the company UBM was used to measure the tan δ of the sample at 50 Hz and 80° C. under a condition of a dynamic strain of 2%. The value of Comparative Example 1 was regarded as 100, and each of the other examples was evaluated as an index relative thereto. It is meant that as a vulcanized rubber is smaller in index, a rubber composition for the vulcanized rubber is lower in exothermic property to be better. The results are shown in Table 1.

A JIS No. 3 dumbbell was used to produce a vulcanized rubber sample of each of the examples, and the 300% modulus thereof was measured in accordance with JIS K6251. The value of Comparative Example 1 was regarded as 100, and each of the other examples was evaluated as an index relative thereto. It is meant that as a vulcanized rubber is larger in index, at the time of the production of a rubber composition for the rubber the rubber is further prevented from being deteriorated, and the rubber composition is better in rubber properties. The results are shown in Table 1.

A crescent shape prescribed in JIS K6252 was used to produce a vulcanized rubber sample of each of the examples. The sample was punched out, and at the center of a depression thereof, a notch was made which had a length of 0.50±0.08 min. A tensile tester manufactured by Shimadzu Corp. was used to test the resultant sample at a tension speed of 500 mm/min. The value of Comparative Example 1 was regarded as 100, and each of the other examples was evaluated as an index relative thereto. It is meant that as a vulcanized rubber is larger in index, the rubber is better in tearing resistance. The results are shown in Table 1.

TABLE 1

|  |  |  |  | Comparative Example 1 | Example 1 | Example 2 | Comparative Example 2 | Example 3 | Example 4 | Comparative Example 3 | Comparative Example 4 | Example 5 | Example 6 |
|---|---|---|---|---|---|---|---|---|---|---|---|---|---|
| Wet rubber masterbatch production | Step (iii) | Natural rubber (solid) | Parts by mass/phr | 100 | 100 | 100 | 100 | 100 | 100 | 100 | 100 | 100 | 100 |
|  |  |  | Parts by mass/phr | 70 | 70 | 70 | 70 | 70 | 70 | 70 | 70 | 70 | 70 |
|  |  | T1 (° C.) |  | 110 | 30 | 90 | 110 | 30 | 30 | 30 | 30 | 30 | 30 |
|  |  | T2 (° C.) |  | 150 | 150 | 190 | 190 | 135 | 185 | 100 | 200 | 150 | 150 |
|  |  | T2-T1 (° C.) |  | 40 | 120 | 100 | 80 | 105 | 155 | 70 | 170 | 120 | 120 |
|  |  | R (rpm) |  | 18 | 18 | 18 | 18 | 23 | 13 | 18 | 18 | 18 | 18 |
|  |  | Length of screw moiety having adjusted temperature |  | L | 0.7 L | 0.7 L | 0.7 L | 0.7 L | 0.7 L | 0.7 L | 0.7 L | 0.7 L | 0.7 L |
|  |  | Screw temperture-adjusted-moiety temperature |  | 90 | 140 | 140 | 140 | 140 | 140 | 140 | 140 | 110 | 260 |
| Rubber composition production | Step (iv) | Zinc Flower | Parts by mass/phr | 3 | 3 | 3 | 3 | 3 | 3 | 3 | 3 | 3 | 3 |
|  |  | Stearic acid | Parts by mass/phr | 2 | 2 | 2 | 2 | 2 | 2 | 2 | 2 | 2 | 2 |
|  |  | Wax | Parts by mass/phr | 2 | 2 | 2 | 2 | 2 | 2 | 2 | 2 | 2 | 2 |
|  |  | Antiaging agent (A) | Parts by mass/phr | 2 | 2 | 2 | 2 | 2 | 2 | 2 | 2 | 2 | 2 |
|  |  | Antiaging agent (B) | Parts by mass/phr | 1 | 1 | 1 | 1 | 1 | 1 | 1 | 1 | 1 | 1 |
|  |  | Sulfur | Parts by mass/phr | 2 | 2 | 2 | 2 | 2 | 2 | 2 | 2 | 2 | 2 |
|  |  | Vulcanization promoter (A) | Parts by mass/phr | 1.5 | 1.5 | 1.5 | 1.5 | 1.5 | 1.5 | 1.5 | 1.5 | 1.5 | 1.5 |
|  |  | Vulcanization promoter (B) | Parts by mass/phr | 0.5 | 0.5 | 0.5 | 0 | 0.5 | 0.5 | 0.5 | 0.5 | 0.5 | 0.5 |
| Wet rubber masterbatch properties |  | Water content (%) |  | 6.8 | 0.5 | 0.6 | 4.1 | 0.8 | 0.6 | 4.5 | 4.7 | 0.7 | 0.6 |
| Physical property evaluations |  | tanδ (tanδ of Comparative Example: 1:100) |  | 100 | 85 | 86 | 110 | 84 | 85 | 113 | 112 | 90 | 91 |
|  |  | Tensile strength (breaking strength of Comparative Example 1:100) |  | 100 | 111 | 110 | 89 | 113 | 112 | 90 | 91 | 105 | 106 |
|  |  | Tearing strength (tearing strength of Comparative Example 1:100) |  | 100 | 113 | 114 | 88 | 113 | 112 | 89 | 88 | 106 | 108 |

The invention claimed is:

1. A process for producing a wet rubber masterbatch yielded by using, as raw materials, at least a filler, a dispersing solvent, and a rubber latex solution, wherein the process comprises:
a step (i) of mixing the filler, the dispersing solvent, and the rubber latex solution with each other to produce a filler-containing rubber latex solution, a step (ii) of solidifying the filler-containing rubber latex solution to produce a filler-containing rubber solidified product, and a step (iii) of dehydrating the filler-containing rubber solidified product to produce the wet rubber masterbatch,
wherein at the time of representing the temperature of the filler-containing rubber solidified product before the dehydration in the step (iii) by T1 (° C.), and representing the temperature of the filler-containing rubber solidified product after the dehydration by T2 (° C.), the following expressions (1) and (2) are satisfied:

$$T1 \leq 100 \quad (1)$$

$$80 \leq T2-T1 \leq 160 \quad (2),$$

wherein the step (iii) is a step of using a monoaxial extruder or a biaxial extruder to dehydrate the filler-containing rubber solidified product, and the rotation number R (rpm) of a screw of the monoaxial extruder or the biaxial extruder satisfies the following: $2 \leq R \leq 35$.

2. The wet rubber masterbatch producing process according to claim 1, wherein the temperature of only a partial moiety of the screw at an outlet side of the screw is adjusted to a temperature of 100° C. or higher and lower than 270° C.

3. The wet rubber masterbatch producing process according to claim 1, wherein at the time of representing the entire length of the screw that is measured from a tip of the screw at an/the outlet side of the screw by L, the temperature of a moiety of the screw that has a length of αL wherein $0.4 \leq \alpha \leq 0.95$ from the tip of the screw at the outlet side thereof is adjusted to a temperature of 100° C. or higher and lower than 270° C.

4. A process for producing a rubber composition comprising a wet rubber masterbatch yielded by using, as raw materials, at least a filler, a dispersing solvent, and a rubber latex solution, wherein the process comprises:
a step (i) of mixing the filler, the dispersing solvent, and the rubber latex solution with each other to produce a filler-containing rubber latex solution, a step (ii) of solidifying the filler-containing rubber latex solution to produce a filler-containing rubber solidified product, a step (iii) of dehydrating the filler-containing rubber solidified product to produce the wet rubber masterbatch, and a step (iv) of dry-mixing the wet rubber masterbatch with various blending agents to produce the rubber composition,
wherein at the time of representing the temperature of the filler-containing rubber solidified product before the dehydration in the step (iii) by T1 (° C.), and representing the temperature of the filler-containing rubber solidified product after the dehydration by T2 (° C.), the following expressions (1) and (2) are satisfied:

$$T1 \leq 100 \tag{1}$$

$$80 \leq T2 - T1 \leq 160 \tag{2},$$

wherein the step (iii) is a step of using a monoaxial extruder or a biaxial extruder to dehydrate the filler-containing rubber solidified product, and the rotation number R (rpm) of a screw of the monoaxial extruder or the biaxial extruder satisfies the following: $2 \leq R \leq 35$.

5. The rubber composition producing process according to claim 4, wherein the temperature of only a partial moiety of the screw at an outlet side of the screw is adjusted to a temperature of 100° C. or higher and lower than 270° C.

6. The rubber composition producing process according to claim 4, wherein at the time of representing the entire length of the screw that is measured from a tip of the screw at an/the outlet side of the screw by L, the temperature of a moiety of the screw that has a length of $\alpha L$ wherein $0.4 \leq \alpha \leq 0.95$ from the tip of the screw at the outlet side thereof is adjusted to a temperature of 100° C. or higher and lower than 270° C.

\* \* \* \* \*